United States Patent
Fan et al.

(10) Patent No.: US 6,580,543 B1
(45) Date of Patent: Jun. 17, 2003

(54) MULTIMODE FIBER COMMUNICATION SYSTEM WITH ENHANCED BANDWIDTH

(75) Inventors: Zhencan Frank Fan, Macungie, PA (US); Hong-Tai Man, Bernards Township, Somerset County, NJ (US); Arlen R. Martin, Maidencreek Township, Berks County, PA (US); Steven L. Moyer, Spring Township, Berks County, PA (US); Mary J. Nadeau, Bethlehem, PA (US); Steven P. O'Neill, Allentown, PA (US); John William Osenbach, Kutztown, PA (US); Edward A. Pitman, Grantville, PA (US); Renyi Yang, Goleta, CA (US); Craig A. Young, Nazareth, PA (US)

(73) Assignee: Tri Quint Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/465,468

(22) Filed: Dec. 16, 1999

(51) Int. Cl.[7] .............................. G02B 6/30; G02B 6/26; H04B 10/13
(52) U.S. Cl. ....................... 359/188; 359/159; 359/173; 385/31; 385/39; 385/88; 385/92
(58) Field of Search ................................ 359/116, 118, 359/127, 151, 159, 188; 385/31, 33, 38, 49, 88, 92

(56) References Cited

U.S. PATENT DOCUMENTS

| | | | | |
|---|---|---|---|---|
| 4,493,113 A | * | 1/1985 | Forrest et al. | 359/152 |
| 4,934,787 A | * | 6/1990 | Ichimura et al. | 385/123 |
| 5,634,159 A | * | 5/1997 | Caregnato | 359/30 |
| 5,642,456 A | * | 6/1997 | Baker et al. | 359/230 |
| 6,086,724 A | * | 7/2000 | Nakatani et al. | 204/157.15 |
| 6,356,687 B1 | * | 3/2002 | Shahid | 385/49 |

FOREIGN PATENT DOCUMENTS

WO    WO/97/33390    3/1997

OTHER PUBLICATIONS

L. Raddatz et al, Influence of Restricted Mode Excitation on Bandwidth of Multimode Fiber Links, Apr. 1998, IEEE Photonics Tech. letters, vol. 10, pp. 534–536.*

\* cited by examiner

*Primary Examiner*—Leslie Pascal
(74) *Attorney, Agent, or Firm*—Lowenstein Sandler PC

(57) ABSTRACT

In accordance with the invention, a multimode optical fiber communication system is provided with offset illumination by disposing an optical pinhole adjacent an end of the multimode fiber core and offset from the center of the core. The pinhole permits direct offset illumination without the difficulty and expense of a conventional patch-cord assembly.

4 Claims, 1 Drawing Sheet

MULTIMODE FIBER COMMUNICATION SYSTEM WITH ENHANCED BANDWIDTH

FIELD OF THE INVENTION

This invention relates to optical fiber communication systems and, in particular, to a multimode fiber communication system employing offset pinhole illumination of the multimode fiber for enhanced bandwidth transmission.

BACKGROUND OF THE INVENTION

Multimode fiber communication systems are widely used for short distance systems such as local area networks (LANs) used to wire campuses, offices, factories and other buildings.

A shortcoming of multimode systems is the tendency of light launched in one mode to couple into other modes. Since each different mode has slightly different propagation characteristics, this coupling can spread propagating pulses in time (modal dispersion), limiting the useful bandwidth-distance product of the system.

One approach to enhancing the bandwidth of multimode systems is to illuminate the multimode fiber with a smaller single mode fiber at a position offset from the center of the multimode fiber core. See International (Patent) Application No. WO97/33390 published Sep. 12, 1997 and entitled "Multimode Communications System," which is incorporated herein by reference. Such systems referred to as offset-launch mode-conditioning patch-cord assemblies, strongly excite mid-order modes of the multimode fiber but only weakly excite low order and high order modes. Since the mid-order modes have similar propagation constants, the modal dispersion is small compared to an excitation of all modes. This offset illumination permits an- increase in the effective bandwidth of a multimode system.

A difficulty with the patch-cord assembly is that it requires precise alignment and joinder of a tiny single mode fiber in relation to both the illumination light source and the small core of the multimode fiber. Such precise alignments and junctions are difficult, time-consuming and expensive to make. Accordingly there is a need for an improved arrangement for providing offset illumination of a multimode fiber.

SUMMARY OF THE INVENTION

In accordance with the invention, a multimode optical fiber communication system is provided with offset illumination by disposing an optical pinhole adjacent an end of the multimode fiber core and offset from the center of the core. The pinhole permits direct offset illumination without the difficulty and expense of a conventional patch-cord assembly.

BRIEF SUMMARY OF THE DRAWINGS

The advantages, nature and various additional features of the invention will appear more fully upon consideration of the illustrative embodiments now to be described in connection with the accompanying drawings. In the drawings.

It is to be understood that the drawings are for purposes of illustrating the concepts of the invention and are not to scale.

DETAILED DESCRIPTION

Figure 1:
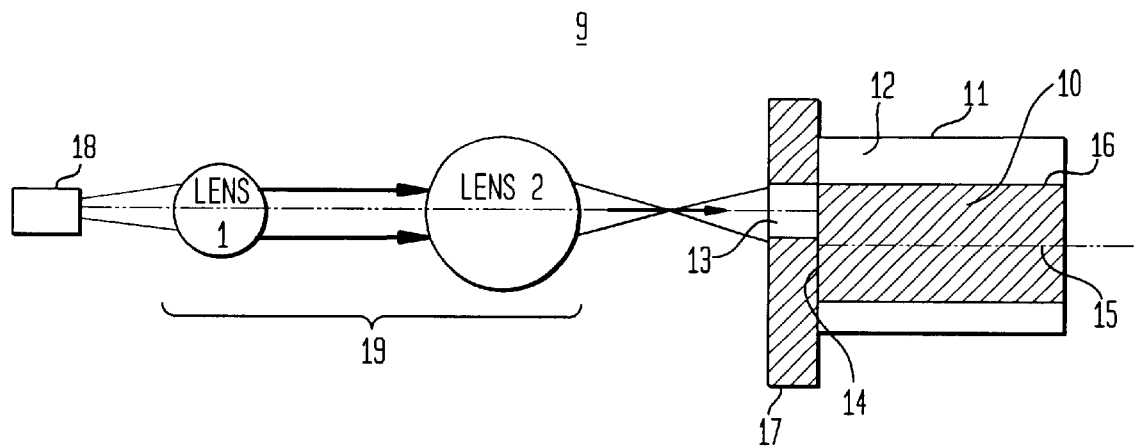
FIG. 1 is a schematic cross section of apparatus for offset illumination of a multimode fiber.

Referring to the drawing, FIG. 1 is a schematic cross section of apparatus 19 for providing offset pinhole illumination of the core 10 of a multimode optical transmission fiber 11. The core 10 is peripherally surrounded by cladding 12. An optical pinhole 13 is disposed adjacent an end 14 of fiber 11 and positioned intermediate the core center 15 (optical axis) and the core periphery 16. The pinhole 13 can be a physical pinhole in an opaque plate or coating 17 at the fiber end. The fiber typically has a core diameter of 50 $\mu$m and a cladding thickness of 30 $\mu$m. The pinhole plate or coating 17 can be metal, opaque plastic or opaque glass, typically ranging in thickness from 10 $\mu$m to 250 $\mu$m. The pinhole 13 can have its center offset 20 $\mu$m (±3 $\mu$m) with respect to the multimode fiber optical axis core center. The diameter of the pinhole is typically in the range 10–25 $\mu$m depending on the optical power requirements of the system. The end 14 of the fiber advantageously makes physical contact with the plate or coating 17 to avoid diffraction effects.

Illumination, as from a modulated laser 18, can be directly coupled to the pinhole and the fiber via a lens system 19 optically aligned with the centerline of the pinhole. The illuminated spot on the multimode fiber is controlled by the pinhole diameter.

Figure 2:
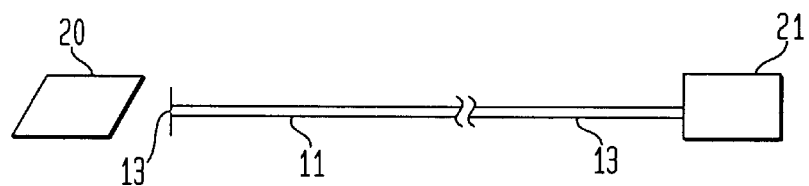
FIG. 2 is a schematic diagram of a multimode fiber communication system employing the apparatus of FIG. 1.

FIG. 2 is a schematic diagram of a multimode fiber communication system employing the illumination apparatus of FIG. 1. The system comprises an illumination source 20 of modulated optical signals, a multimode optical transmission fiber 11, and one or more optical receivers 21 optically coupled to the fiber 11. The source 20, which may include laser 18 of FIG. 1, is coupled to the fiber 11 via a pinhole 13 offset from the core center as described above.

In operation the modulated light is launched into fiber 11 and transmitted predominantly as mid-order modes. Because the mid-order modes have similar propagation constants, the light reaches the receiver 21 with reduced modal dispersion as compared with light launched into core the center. For a given transmission distance, the reduced module dispersion permits increased pulse repetition rate and thus provides increased bandwidth.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. An optical fiber communication system comprising:
   a source of modulated light;
   a multimode optical fiber for transmitting the modulated light, the fiber comprising a core having a center and a cladding peripherally surrounding the core; and
   adjacent an end of the fiber between the source and the core, a plate or coating defining an optical pinhole offset with respect to the core center for providing offset illumination of the core from the source.

2. The system of claim 1 wherein the pinhole is offset 17–23 $\mu$m from the core center.

3. The system of claim 1 wherein the pinhole has a diameter in the range 10–25 $\mu$m.

4. The system of claim 1 wherein the plate or coating has a thickness in the range 10 $\mu$m–250 $\mu$m.

* * * * *